United States Patent
Haskett et al.

(10) Patent No.: US 7,700,178 B2
(45) Date of Patent: *Apr. 20, 2010

(54) CLEANING WIPE WITH VARIABLE LOFT WORKING SURFACE

(75) Inventors: Thomas E. Haskett, Oakdale, MN (US); Amy M. Kunz, New Richmond, WI (US); Jill R. Munro, St. Paul, MN (US); John M. Simon, Edina, MN (US); Diane R. Wolk, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 105 days.

This patent is subject to a terminal disclaimer.

(21) Appl. No.: 11/362,549

(22) Filed: Feb. 24, 2006

(65) Prior Publication Data
US 2007/0202768 A1 Aug. 30, 2007

(51) Int. Cl.
*B32B 3/00* (2006.01)
*B32B 5/02* (2006.01)
*B32B 9/00* (2006.01)

(52) U.S. Cl. ............... 428/156; 428/170; 428/171; 428/212; 428/213; 428/218; 442/59; 442/149; 442/151; 442/327

(58) Field of Classification Search ............... 442/59, 442/149, 151, 327; 428/156, 170, 171, 212, 428/213, 218
See application file for complete search history.

(56) References Cited

U.S. PATENT DOCUMENTS

| 3,542,634 A | 11/1970 | Such et al. |
| 3,765,997 A | 10/1973 | Dunning |
| 3,965,519 A | 6/1976 | Hermann |
| 4,211,227 A | 7/1980 | Anderson et al. |
| 4,422,892 A | 12/1983 | Plant |
| 4,537,819 A | 8/1985 | Schortmann et al. |
| 4,612,231 A | 9/1986 | Bouchette et al. |
| 4,761,322 A | 8/1988 | Raley |
| 4,883,707 A | 11/1989 | Newkirk |
| 5,149,332 A | 9/1992 | Walton et al. |
| 5,277,761 A * | 1/1994 | Van Phan et al. ............ 162/109 |
| 5,302,446 A | 4/1994 | Horn |
| 5,522,110 A | 6/1996 | Borofsky |

(Continued)

FOREIGN PATENT DOCUMENTS

DE 37 44 438 A1 7/1989

(Continued)

*Primary Examiner*—Norca L Torres-Velazquez
(74) *Attorney, Agent, or Firm*—Trisha D. Adamson

(57) ABSTRACT

One aspect of the present invention relates to a cleaning wipe for picking up diverse debris, such as sand, dust, hair, and food particles. In one aspect, the cleaning wipe comprises a web defining a working surface opposite a second surface, the working surface defining at least a first region having a first degree of loftiness and a first height, a second region having a second degree of loftiness and a second height, and a third region having a third degree of loftiness and a third height. The third region includes an adhesive. The first degree of loftiness is greater than the second degree of loftiness, which is greater than the third degree of loftiness. The first height is greater than the second height, which is greater than the third height.

12 Claims, 4 Drawing Sheets

U.S. PATENT DOCUMENTS

| | | | |
|---|---|---|---|
| 5,575,874 | A | 11/1996 | Griesbach, III et al. |
| 5,643,653 | A | 7/1997 | Griesbach, III et al. |
| 5,655,250 | A | 8/1997 | Warrell |
| 5,958,555 | A | 9/1999 | Takeuchi et al. |
| 5,980,673 | A | 11/1999 | Takeuchi et al. |
| 6,013,349 | A | 1/2000 | Takeuchi et al. |
| 6,213,344 | B1 | 4/2001 | Hill et al. |
| 6,309,731 | B1 | 10/2001 | Takeuchi et al. |
| 6,506,474 | B2 | 1/2003 | Tsuji |
| 6,550,092 | B1 | 4/2003 | Brown et al. |
| 6,561,354 | B1 | 5/2003 | Fereshtehkhou et al. |
| 6,613,954 | B1 | 9/2003 | Horney et al. |
| 6,645,604 | B1 | 11/2003 | Fereshtehkhou et al. |
| 6,777,064 | B1 | 8/2004 | Brown et al. |
| 6,797,357 | B2 | 9/2004 | Fereshtehkhou et al. |
| 6,810,554 | B2 | 11/2004 | McKay |
| 7,007,801 | B2 | 3/2006 | Mangold et al. |
| 2001/0029966 | A1 | 10/2001 | Wong et al. |
| 2002/0065012 | A1* | 5/2002 | Takabayashi et al. ....... 442/381 |
| 2003/0003831 | A1 | 1/2003 | Childs et al. |
| 2003/0044569 | A1 | 3/2003 | Kacher et al. |
| 2003/0049407 | A1 | 3/2003 | Kacher et al. |
| 2003/0077106 | A1 | 4/2003 | Weihrauch |
| 2003/0094186 | A1 | 5/2003 | Klein |
| 2003/0171051 | A1 | 9/2003 | Bergsten et al. |
| 2004/0031119 | A1 | 2/2004 | McKay |
| 2004/0055102 | A1 | 3/2004 | Treacy et al. |
| 2004/0078915 | A1 | 4/2004 | Hockey-Smith et al. |
| 2004/0106345 | A1 | 6/2004 | Zafiroglu |
| 2004/0106346 | A1 | 6/2004 | Zafiroglu |
| 2004/0116017 | A1 | 6/2004 | Smith, III et al. |
| 2004/0121686 | A1 | 6/2004 | Wong et al. |
| 2004/0131820 | A1 | 7/2004 | Turner et al. |
| 2004/0137200 | A1 | 7/2004 | Chhabra et al. |
| 2004/0187275 | A1 | 9/2004 | Kennedy et al. |
| 2005/0003156 | A1 | 1/2005 | Fereshtehkhou et al. |
| 2006/0063456 | A1* | 3/2006 | Carter ........................ 442/327 |
| 2006/0068167 | A1 | 3/2006 | Keck et al. |

FOREIGN PATENT DOCUMENTS

| | | |
|---|---|---|
| EP | 1066962 B1 | 9/2004 |
| JP | 10-171595 | 6/1998 |
| JP | 2000-234253 | 8/2000 |
| JP | 3-231993 | 9/2001 |
| JP | 2002-369782 | 12/2002 |
| JP | 15-103677 A | 4/2003 |
| JP | 2004313559 A | 11/2004 |
| WO | WO 90/14039 | 11/1990 |
| WO | WO 98/52458 | 11/1998 |
| WO | WO 98/52459 | 11/1998 |
| WO | WO 01/41622 A2 | 6/2001 |
| WO | WO 02/00088 A2 | 1/2002 |
| WO | WO 2004/060133 A1 | 7/2004 |
| WO | WO 2004/073479 A2 | 9/2004 |

* cited by examiner ized as having differing degrees of loftiness and height

CLEANING WIPE WITH VARIABLE LOFT WORKING SURFACE

BACKGROUND

The present invention relates to cleaning wipes for removing debris from surfaces. More particularly, it relates to cleaning wipe constructions for removing diverse debris such as hair, dirt, dust, and the like, from hard surfaces.

Cloths and other wiping products are used in cleaning. Most wiping products, or wipes, are made from either a woven or nonwoven sheet, and are used either by hand or attached to a tool like a mop handle to move dirt and dust in a desired direction. Typically, most wiping products do not have the ability to effectively capture and retain small and large particles of dirt and debris. During cleaning, when the dirt or dust has been collected, the wipe may be scrunched up by the user to try to capture the dirt or sand that has been collected so that it can be shaken out in the trash. This process is repeated during cleaning and often requires a user who is attempting to pick up larger particles such as sand to repeat the process several times to pick up all the sand or heavier particles that have been collected. Many times a user will pickup the debris with a broom and dust pan once it has been gathered into a pile with the wipe.

An adhesive sheet may be used to clean a surface. Additionally, adhesive may be incorporated into a wipe to assist with retaining both small and large particle of dirt and debris within the wipe. However, adhesive may adhere to the surface being cleaned. Therefore, sufficient spacing between the surface being cleaned and the adhesive layer is necessary to provide sufficient glide of the wipe while still providing sufficient pick-up of the dirt and debris.

SUMMARY

One aspect of the present invention relates to a cleaning wipe for picking up diverse debris, such as sand, dust, hair, and food particles. In one aspect, the cleaning wipe comprises a web defining a working surface opposite a second surface, the working surface defining at least a first region having a first degree of loftiness and a first height, a second region having a second degree of loftiness and a second height, and a third region having a third degree of loftiness and a third height. The third region includes an adhesive. The first degree of loftiness is greater than the second degree of loftiness, which is greater than the third degree of loftiness. The first height is greater than the second height, which is greater than the third height.

In another aspect of the present invention, the cleaning wipe comprises a web defining a working surface opposite a second surface and an outer layer connected to the web. The working surface has a uniform material construction and defines a plurality of laterally extending first regions, a plurality of laterally extending second regions, and a plurality of laterally extending third regions including an adhesive. The first, second, and third regions are arranged in a repeating pattern of adjacent first regions separated by second regions adjacent ones of which are separated by one of the third regions. A width of each first region is greater than a width of each third region.

In another aspect of the present invention, the cleaning wipe comprises a web defining a working surface opposite a second surface, the working surface having a uniform material construction and defining a plurality of laterally extending first regions having a first height, a plurality of laterally extending second regions having a second height, and a plurality of laterally extending third regions having a third height and wherein the third region includes an adhesive. The first height is greater than the second height, which is greater than the third height. The first, second, and third regions are arranged in a repeating pattern of adjacent first regions separated by second regions adjacent ones of which are separated by one of the third regions. A width of each first region is greater than a width of each third region.

While the above-identified drawings and figures set forth embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of this invention. The figures may not be drawn to scale.

DETAILED DESCRIPTION

Cleaning Wipe Characteristics

Figure 1:
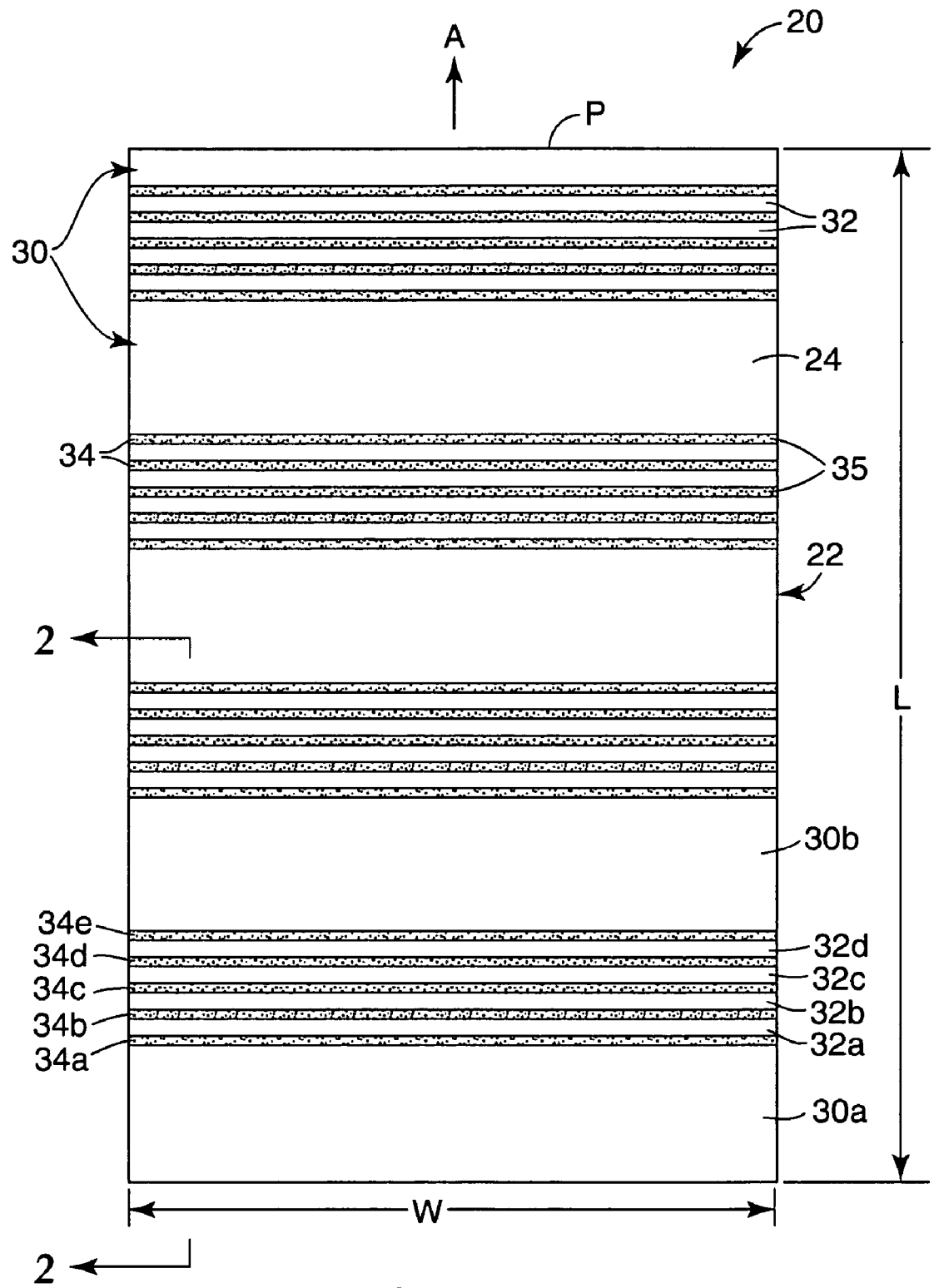
FIG. 1 is a top, schematic illustration of one embodiment of a cleaning wipe in accordance with the present invention.

One embodiment of a cleaning wipe 20 in accordance with the present invention is provided in FIG. 1. In general terms, the cleaning wipe 20 includes a fiber web 22 forming a working surface 24. The term "working surface" is in reference to a side of the cleaning wipe 20 that is otherwise presented to and guided (or "wiped") across a surface to be cleaned (not shown). In the view of FIG. 1, then, the working surface 24 is facing out of the page, with the cleaning wipe 20 having a second surface (hidden in FIG. 1) opposite the working surface 24. With this designation in mind, the working surface 24 defines one or more first regions 30, one or more second regions 32 and one or more third regions 34. As described below, the first, second and third regions 30-34 are characterized as having differing degrees of loftiness and height, adapted to facilitate capture or retention of lightweight, fine debris (not shown), for example hair (e.g., human hair, pet hair, etc.) in one or more of the first region(s) 30, and capture or retention of particulate-type debris (not shown), for example dirt in one or more of the second region(s) 32. Thus, in one embodiment, the cleaning wipe 20 of the present invention is well-suited for use in cleaning hard surfaces in areas having both hair and other debris such as a floor.

Figure 2:
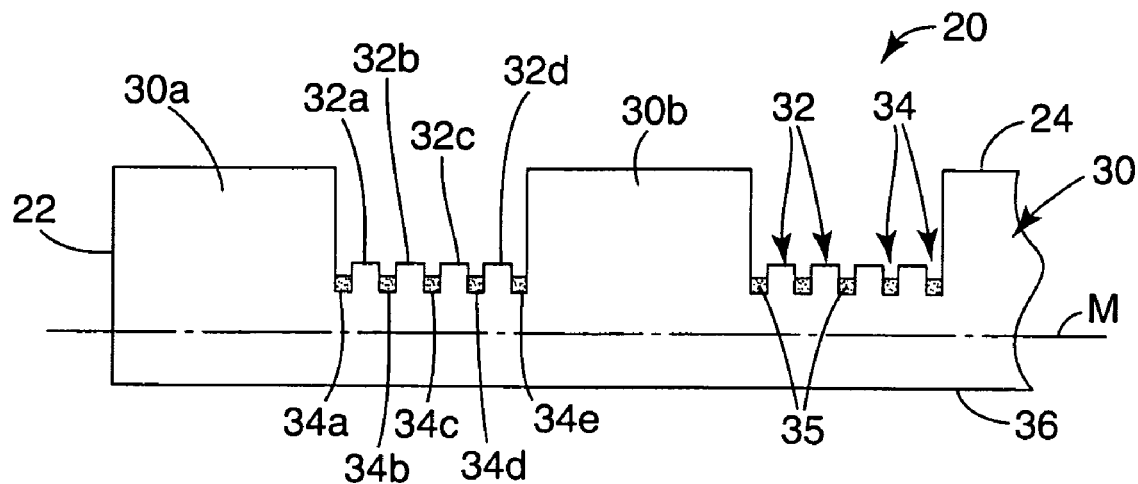
FIG. 2 is a schematical cross-sectional view of a portion of the cleaning wipe of FIG. 1, taken along the lines 2-2.
Figure 3:
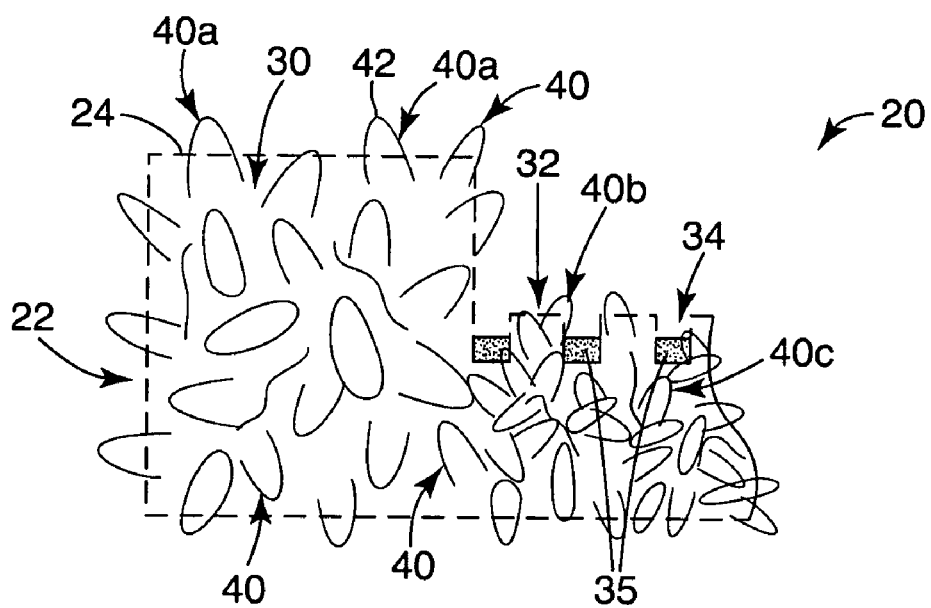
FIG. 3 is an enlarged, cross-sectional view of a portion of the cleaning wipe of FIG. 1, illustrating fibers within the wipe.

To better illustrate the loftiness characteristics associated with the first, second and third regions 30-34, reference is made to FIGS. 2 and 3. FIG. 2 is a schematic cross-sectional view of the cleaning wipe 20 (and further illustrates a second side 36 opposite the working surface 24), whereas FIG. 3 provides an enlarged view of one embodiment of the cleaning wipe 20 including fibers 40 (referenced generally). With this in mind, and in one embodiment, the web 22 has a uniform material construction (i.e., the web 22 is comprised of a uniform material/composition as described below), and is processed to generate the differing first, second and third regions 30-34. In particular, the web 22 is configured such that the first regions 30 have a first degree of loftiness and a first height, the second regions 32 have a second degree of loftiness and a second height, and the third regions 34 have a third degree of loftiness and a third height. To this end, the regions 30-34 are visually distinct from one another, meaning that they are readily discernable to the naked eye. Alternatively, the web 22 can consist of two or more webs brought together to form the first regions 30 (and/or the second regions 32). For example, a first web can be provided that forms the second and third regions 32, 34, and second web(s) (higher loft) can be secured to the first web to form the first regions 30.

The term "degree of loftiness" as used in this specification is in reference to the spacing or "openness" of fibers otherwise forming the surface/area/volume in question. For example, a first surface/area/volume with fewer fibers per unit area or volume as compared to a second surface/area/volume comprised of the same denier fibers is considered to have a higher degree of loftiness. Alternatively, degree of loftiness can be defined as in terms of bulk density. "Bulk density" is the weight of a given web per unit volume. The web thickness can be measured in many ways; one accurate method employs an optical scanning technique.

The term "height" as used in this specification is in reference to extension of the working surface 24 beyond (or "above" relative to the orientations of FIGS. 2 and 3) relative to a mid-plane M that is otherwise generally parallel to a planar orientation of the web 22 (e.g., parallel to the second side 36 when the second side 36 is otherwise generally flat, it being understood that the second side 36 need not necessarily be flat). Alternatively, height can be measured from/relative to the second side 36.

With reference to the above conventions, the first degree of loftiness (i.e., the degree of loftiness associated with the first regions 30) is greater than the second degree of loftiness; and the second degree of loftiness is greater than the third degree of loftiness. Similarly, the first height (i.e., the height associated with the first regions 30) is greater than the second height; and the second height is greater than the third height. With specific reference to FIG. 3, the degree of loftiness is better illustrated by the "openness" of the fibers 40. For example, the first regions 30 can be described as including fibers 40a, the second regions 32 as including the fibers 40b, and the third regions 34 as including the fibers 40c. The fibers 40a are more distinctly spaced apart as compared to the fibers 40b; and the fibers 40b are more distinctly spaced apart as compared to the fibers 40c. Thus, the first regions 30 can be described as having fewer fibers 40 per unit volume as compared to the number of fibers 40 per unit volume of the second regions 32. Similarly, the second regions 32 can be described as having fewer fibers 40 per unit volume as compared to the number of fibers 40 per unit volume of the third regions 34. As described below, in one embodiment, this difference in degree of loftiness or fibers per unit volume can be achieved by compressing the web 22 to a greater extent in the third regions 34 as compared to the second regions 32, and by compressing the web 22 to a greater extent in the second regions 32 as compared to the first regions 30.

Regardless, in one embodiment, the bulk density of the first regions 30 is at least 100% less than the bulk density of the second regions 32, more preferably at least 200% less than, and even more preferably at least 300% less than. It will be understood that by having a lesser bulk density, the first degree of loftiness (of the first regions 30) is thus greater than the second degree of loftiness (of the second regions 32) as bulk density has an inverse relationship with loftiness. In a further embodiment, the bulk density of the second regions 32 is at least 100% less than the bulk density of the third regions 34, and more preferably at least 200% less than.

As further evidenced by FIG. 3, the fibers 40 comprising the web 22 are, in one embodiment, randomly or semi-randomly dispersed within the web 22. Thus, the web 22 does not have clear "edges" as otherwise reflected in the schematic illustrations of FIGS. 1 and 2. Instead, various ones of the fibers 40 "extend" or project beyond hypothetical edges of the web 22 (shown with dashed lines in FIG. 3). With this construction, the "height" of a particular region can be more accurately described as the nominal height defined by a majority of the fibers 40 positioned/extending at the working surface 24. For example, the fibers 40a combine to define a height of the first region 30 shown in FIG. 3. It will be further understood, then, that individual ones of the first regions 30 need not have identical heights, nor need the second regions 32 and/or the third regions 34.

Regardless, and in one embodiment, the height of the first regions 30 is at least 120% of the height of the second regions 32, more preferably at least 150%, and even more preferably at least 200%. In a further embodiment, the height of the second regions 32 is at least 110% of the height of the third regions 34, more preferably at least 125%, and even more preferably at least 135%. Alternatively stated, relative to a general plane of the working surface 24 defined by the third regions 34, the second regions 32 extend beyond (or "above" relative to the orientation of FIGS. 2 and 3) the third regions 34, and the first regions 30 extend beyond (or "above" relative to the orientation of FIGS. 2 and 3) the second regions 32.

An adhesive 35 is included on the wipe 20 and preferably on at least the third region 34 to assist in holding and retaining dirt and debris. U.S. patent application Ser. No. 10/093792, filed on Mar. 8, 2002, the disclosure of which is herein incorporated by reference, generally discloses a wipe with raised portions and recessed portions including adhesive in the recessed portion. Preferably, the adhesive 35 is included at the third region 34. Alternatively, the adhesive 35 may be included at the third region 34 and the second region 32. The adhesive 35 may be included only at the second region 32. The adhesive 35 may only be applied in a select number of third regions 34 or second regions 32. The adhesive 35 may only be applied across a portion of each of the individual third regions 34 or second regions 32. Preferably, the adhesive 35 is applied from one edge of the wipe continuously across to the other edge, however that is not required.

Generally, adhesive 35, in a tacky form, is not included at the first region 30. If an adhesive 35 is included at the first region 30, that adhesive will generally be detackified or would only be included on a select number of first regions 30. Including adhesive 35 in a tacky form at the first region 30 limits the ability of the web 22 to slide over a surface to be cleaned.

Suitable adhesives for use with the present invention include any that are capable of being tacky at room temperature, including both adhesives that are initially tacky and those that are initially non-tacky but which can be activated to become tacky. Suitable adhesives include any pressure-sensitive adhesives, including materials based on acrylates, silicones, poly-alpha-olefins, polyisobutylenes, rubber block copolymers (such as styrene/isoprene/styrene and styrene/butadiene/styrene block copolymers), styrene butadiene rubbers, synthetic isoprenes, natural rubber, and blends thereof.

The pressure-sensitive adhesives may be coated from solvent, from water, radiation polymerized, or hot melt processed. These pressure-sensitive adhesives may or may not be crosslinked. Crosslinking can be done by well-known methods, including chemical, ionic, physical, or radiation-induced processes. If the adhesive is to be pushed through the wiping member, materials with low viscosity are preferred. To improve the cohesive strength of the adhesive once deposited into the valleys of the wiping member, some crosslinking may be used. To allow for low viscosity for easy processing while providing for good cohesive strength, adhesives with physical crosslinking, ionic crosslinking, or some form of post-crosslinking are preferred. Post-crosslinking can be carried out by exposing the adhesive to radiation, such as electron-beam or high intensity ultraviolet (UV) radiation. For UV crosslinking, it may be desirable to incorporate a photo-receptive group in the polymer backbone to facilitate the crosslinking reaction. U.S. Pat. No. 4,737,559 (Kellen et al.) discloses examples of such UV-crosslinked adhesives. Physical or ionic crosslinking provide the advantage that the process is thermally reversible, making it particularly preferred for hot-melt processing. Physically-crosslinked adhesives include those based on rubber block copolymers. Examples of synthetic rubber block copolymers include Kraton™ commercially available from Kraton Polymers of Houston, Tex., and Vector™ commercially available from Exxon-Mobil of Houston, Tex. These block copolymers are typically formulated into pressure sensitive adhesives by compounding them with tackifiers and/or oils. Details about the formulation of these types of adhesives can be found in the Handbook of Pressure Sensitive Adhesive Technology, Second Edition, chapter 13 (D. Satas editor, Van Nostrand Reinhold publisher, N.Y.) Other physically crosslinked adhesives include macromer grafted polymers as disclosed in U.S. Pat. No. 5,057,366 (Husman et al.).

The adhesives useful in this invention may be tacky under both dry and wet conditions. Adhesives with high tack under wet conditions are disclosed in U.S. Pat. No. 6,855,386. The pressure-sensitive adhesives may also be coated from water in the form of a latex or dispersion. As discussed in the Handbook of Pressure-Sensitive Adhesive Technology $2^{nd}$ edition (D. Satas editor, Van Nostrand Reinhold, N.Y., 1989), these adhesives may be based on polymers like natural rubber, acrylates, styrene-butadienes, and vinyl ethers. Especially when coated directly on a porous, woven, or nonwoven substrate, the neat latex adhesives may not be viscous enough to prevent excessive penetration into the substrate. Whereas the viscosity and flow of the latex adhesive may be controlled by the solids content of the material, it may be more beneficial to formulate the latex with thickening agents. Thickening agents are typically categorized as water-soluble polymers or associative thickeners. Their nature and mechanism of operation are described in Emulsion Polymerization and Emulsion Polymers, chapter 13, page 455 (P. Lovell and M. El-Aasser editors, John Wiley and Sons, N.Y., 1997). As discussed in the Handbook of Pressure-Sensitive Adhesive Technology $2^{nd}$ edition, chapter 16, page 473 (D. Satas editor, Van Nostrand Reinhold, N.Y., 1989), in the case of pressure-sensitive adhesives, particular care has to be taken in the selection of the thickening agent so it does not interfere with the adhesive properties.

Figure 4:
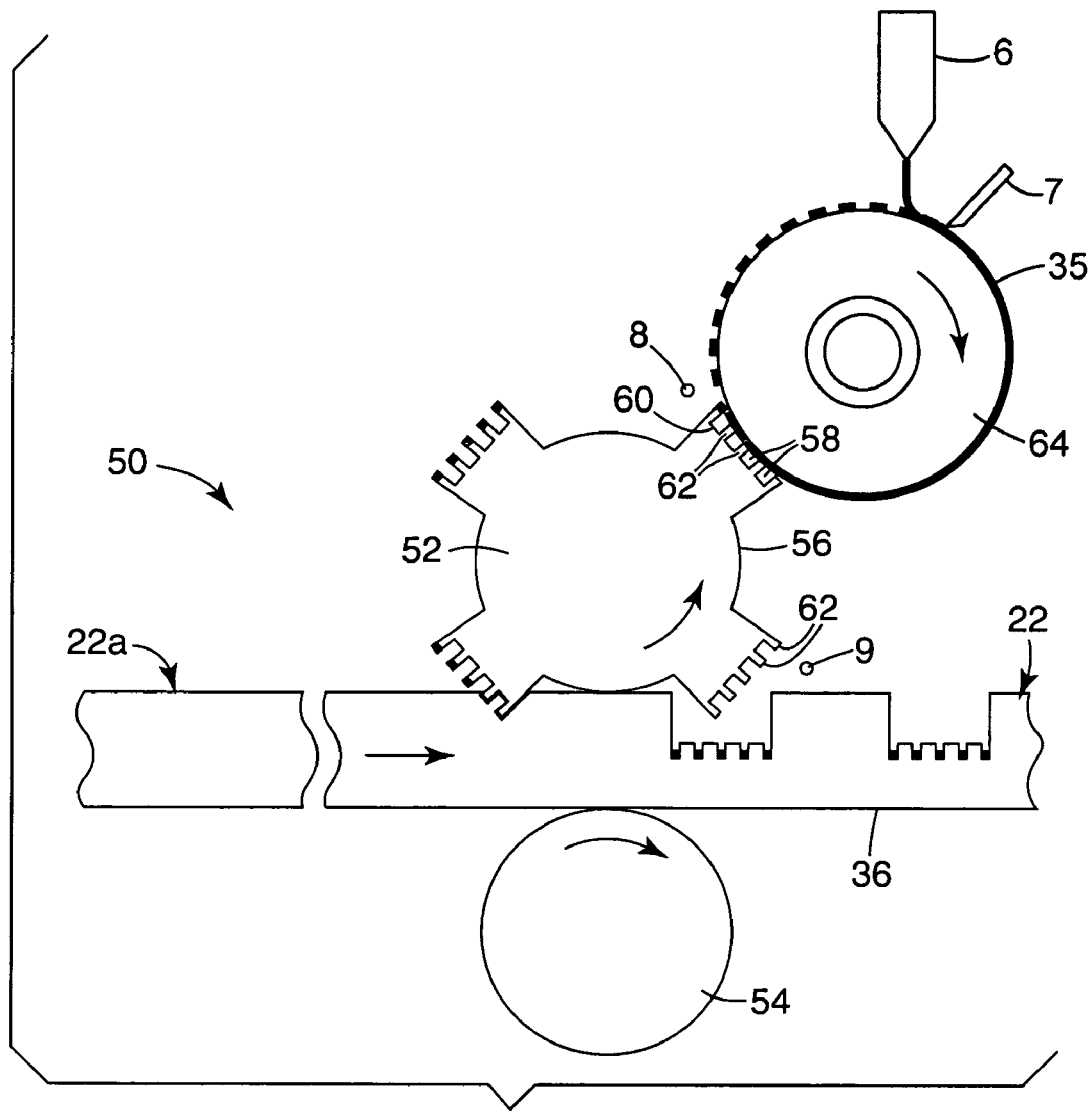
FIG. 4 is a schematic illustration of a system for forming the cleaning wipe of FIG. 1 in accordance with the present invention.

The amount of adhesive that should be applied depends on a number of factors, including the tackiness of the adhesive, the degree to which the adhesive may be squeezed through the wiping member, directly coated as shown in FIG. 4, the characteristics of the wiping member and the backing member (particularly in regard to the amount of adhesive that can be pushed through each member), the degree to which the adhesive adheres to surfaces (and thus makes wiping difficult), and other such factors. The amount of adhesive should be sufficient enough for the wipe to capture both small and large particles of various shapes and consistencies, such as lint, dust, hair, sand, food particles, gravel, twigs, leaves, and the like, without having excess adhesive that could create drag and make wiping difficult or that could transfer to the surface being cleaned. The adhesive may be applied as a continuous layer or as a discontinuous layer and may be applied by a variety of methods such as stripe coating, pattern coating, spray coating, screen printing, etc., as is known in the art. The wipe constructions will typically include from about 5 weight % to about 200 weight % of adhesive, more typically from about 10 weight % as directly applied to regions on the working surface 24 as shown in FIG. 4 or up to about 130 weight % of adhesive as coated and squeezed though to the working surface 24, based on the weight of the input nonwoven wiping member (or the combined weight of the input nonwoven wiping member and the backing member, if a backing member is present). Also, the ratio between areas that have adhesive and those that either have no adhesive or a de-tackified adhesive can range from about 75:25 to about 10:90.

Returning to FIGS. 1 and 2, the first, second and third regions 30-34 are arranged, in one embodiment, to define a pattern. For example, in one embodiment, the first regions 30 can be defined as including a series of pairs of adjacent first regions, such as the first regions 30a and 30b. The adjacent first regions 30a, 30b are spaced from one another by a plurality of the second regions 32 (designated in FIGS. 1 and 2 as the second regions 32a, 32b, 32c, and 32d) and a plurality of the third regions 34 (designated in FIGS. 1 and 2 as the third regions 34a, 34b, 34c, 34d, and 34e). Further, the plurality of second regions 32a-32d located between the adjacent first regions 30a, 30b are each separated by a respective one of the third regions 34b-34d. For example, the second regions 32a, 32b are separated by the third region 34b. In one embodiment, this pattern is repeated across an entirety of the working surface 24 (e.g., the same number of second regions 32 and third regions 34 are disposed between adjacent pairs of the first regions 30, with the first regions 30 each having the same dimensions, the second regions 32 each having the same dimensions, and the third regions 34 each having the same dimensions). Alternatively, the pattern can be non-repeating. Regardless, at least one adjacent pair of first regions 30 are formed and separated by at least one of the second regions 32 and at least one of the third regions 34.

In one embodiment, to promote the capture or retention of fine, lightweight debris (e.g., hair) in the first regions 30, the first regions 30 are wider than the second and third regions 32, 34. To this end, each of the regions 30-34 can be described as generally defining a length and a width (it being recalled that in accordance with one embodiment in which the web 22 includes the randomly distributed fibers 40, distinct edges (and thus uniform width) are not necessarily present).

In one embodiment, as depicted in FIG. 1, relative to a perimeter P of the web 22, the regions 30-34 are oriented such that the length of each region 30-34 extends across at least a majority, more preferably at least 75%, and in one embodiment an entirety, of a dimension of the perimeter P. For example, with the embodiment of FIG. 1 in which the web 22 has the perimeter P that otherwise is generally rectangular, having a length L and a width W, each of the regions 30-34 extends across the width W. In other words, the length of each of the regions 30-34 approximates the width W of the web 22. Therefore, in this embodiment, the regions 30-34 are preferably arranged such that the respective lengths extend generally perpendicular to an intended wiping direction (shown with an arrow A in FIG. 1).

Figure 6:
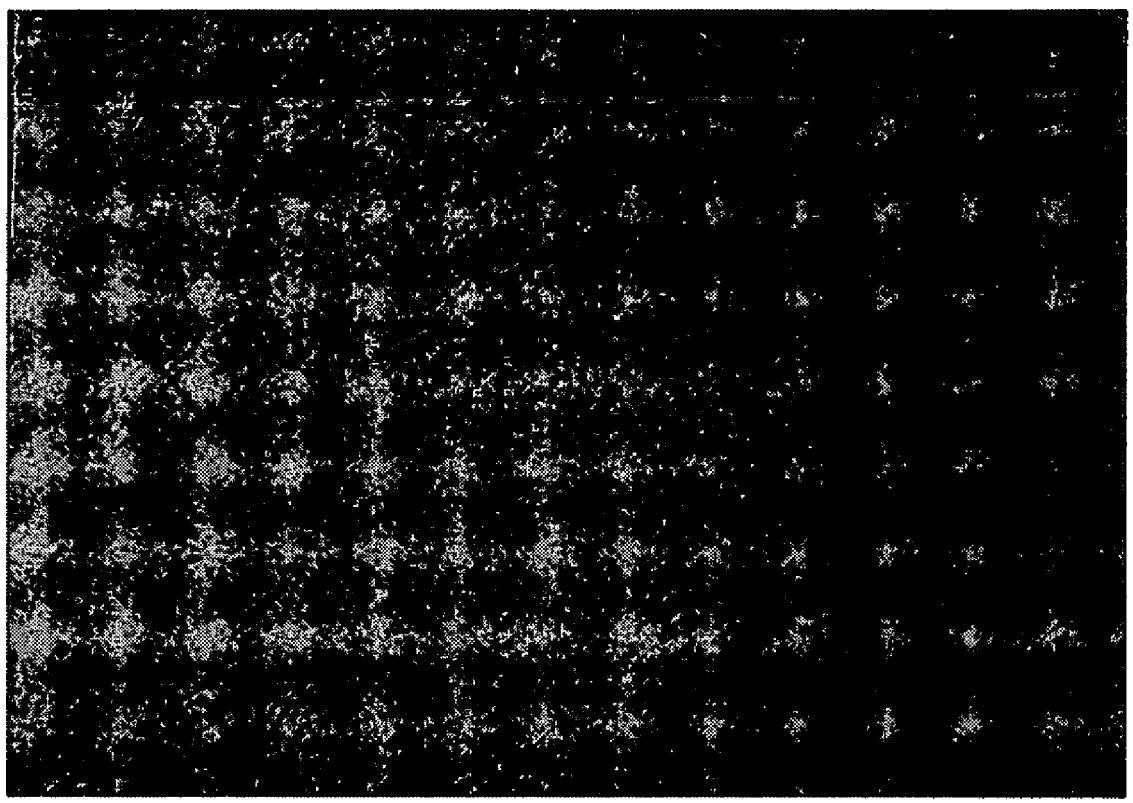
FIG. 6 is a view of another embodiment of a cleaning wipe.

Alternatively, and as described below, the web 22, and thus the cleaning wipe 20, can assume a wide variety of other shapes such that the perimeter P need not be rectangular. Additionally, the regions 30-34 are not required to be arranged generally perpendicular to an intended wiping direction. Other arrangements of the regions 30-34 are desirable, such as, but not limited to, an arrangement of the regions 30-34 extending parallel to one another but generally diagonal with respect to the intended wiping direction. As shown in the embodiment of FIG. 6, arrow A indicates the intended wiping direction and the regions 30-34 are generally diagonally disposed with respect to direction A. The angle of the regions may range from 0 degrees (parallel to the intended wiping direction A) to 90 degrees (perpendicular to the intended wiping direction A). One preferred embodiment, the regions 30-34 are at and angle of 45 degrees with respect to an intended wiping direction, as depicted by FIG. 6.

With the above conventions in mind, a width of each of the first regions 30 is, in one embodiment, wider that a width of the second regions 32 and the third regions 34. For example, in one embodiment, a width of the first regions 30 is at least 150% of a width of the second and third regions 32, 34; more preferably at least 225%; and even more preferably at least 300%. Additionally, in one embodiment, a width of the second regions 32 is wider than the third regions 34, for example on the order of 200%-300% wider. Alternatively, the second regions 32 can be even wider or less wide as compared to the third regions 34. Further, and in one embodiment, a significant spacing is provided between adjacent pairs of the first regions 30 (e.g., the first regions 30a, 30b) via the one or more second regions 32 (e.g., the second regions 32a-32d) and the one or more third regions 34 (e.g., the third regions 34a-34e). For example, in one embodiment, a spacing between adjacent pairs of the first regions 30 (e.g., the first regions 30a, 30b) is not less than 75% of the width of the first regions 30; more preferably at least 100% of the width of the first regions 30; even more preferably at least 150% of the width of the first regions 30.

Although the first regions 30, the second regions 32, and the third regions 34, respectively, are illustrated in FIG. 1 as being identical in terms of shape and size, individual ones of the regions 30, 32 and/or 34 can vary from one another. For example, in one alternative embodiment, a first one of the first regions 30 can be wider that a second one of the first regions 30. Similarly, ones of the second regions 32 can vary in width from others of the second regions 32, as can the third regions 34. Further, one or more of the regions 30, 32, and/or 34 need not have the generally rectangular shape depicted in the exemplary embodiment of FIG. 1. For example, one or more or all of the first regions 30 can be triangular, circular or wavy, as can one or more or all of the second regions 32 and/or the third regions 34. The present invention encompasses virtually any configuration of the regions 30, 32 and 34 so long as at least one of each of the first, second and third regions 30-34 are provided, with the first region 30 having a higher degree of loftiness and height as compared to the second and third regions 32, 34, and the second region 32 having a higher degree of loftiness and height as compared to the third region 34. Regardless, in one embodiment, it has surprisingly been found that where the cleaning wipe 20 is adapted for attachment to a cleaning tool head (described below) otherwise providing a major dimension on the order of 5 inches (plus or minus 1 inch), a minimum of two of the first regions 30 is included with the cleaning wipe 20 to provide uniform weight support.

Web Constructions

The web 22 can assume a wide variety of constructions that facilitate formation of the high loft first regions 30. As described below, in one embodiment, the working surface 24 is defined by subjecting an initial web or combination of two or more webs (that otherwise result in the web 22) to various processing methods, for example compression. With this in mind, the following description of the web 22 is with respect to an initial web 22a (shown in FIG. 4) following initial formation and prior to subsequent processing to otherwise form the working surface 24.

The web 22a or individual fiber web layers thereof can be a knitted, woven, or preferably a non-woven fibrous material. With the one embodiment in which the web 22a is a non-woven fibrous structure, the web 22a is comprised of individual fibers entangled with one another (and optionally bonded) in a desired fashion. The fibers are preferably synthetic or manufactured, but may include natural fibers. As used herein, the term "fiber" includes fibers of indefinite length (e.g., filaments) and fibers of discrete length (e.g., staple fibers). The fibers used in connection with the web 22a may be multicomponent fibers. The term "multicomponent fiber" refers to a fiber having at least two distinct longitudinally coextensive structured polymer domains in the fiber cross-section as opposed to blends where the domains tend to be dispersed, random, or unstructured. Regardless, useful fiberous materials include, for example, polyesters, polyamides, polyimides, nylon, polyolefins (e.g., polypropylene and polyethylene), etc., of any appropriate fiber length and denier, and mixtures thereof. Further, some or all of the fibers can have special treatments to enhance hydrophilic properties, such as additives including super-absorbing gel polymers; also, powder(s) or fiber(s) such as but not limited to rayon, cotton, and cellulose, can be added to enhance liquid holding capacity.

Small denier size staple fibers (e.g., 3d-15d) provide the web 22a with smaller pore sizes and more surface area as compared to a fiber web made with larger denier fibers (e.g., 20d-200d) that otherwise provides the web 22a with larger pore sizes and less surface area. The small denier fiber webs are best suited for cleaning surfaces contaminated with fine dust and dirt particles, whereas the large denier fiber webs are best suited for cleaning surfaces contaminated with larger dirt particles such as sand, food crumbs, lawn debris, etc. As described above, the larger pore sizes of the larger denier staple fibers allows the larger contaminant particles to enter, and be retained by, the matrix of the fiber web. The web 22a of the present invention can include one or both of the small and/or large denier fibers that may or may not be staple fibers. In one embodiment, the fiber web 22a includes crimped, high heat distortion fibers. Preferably, however, to ensure desired loftiness, a majority of the fibers of the web 22a are of a larger denier (e.g., at least 20 denier, more preferably at least 25 denier). For example, in one embodiment, the web 22 includes 45% 15 denier PET fibers, 25% 6 denier PET fibers, and 30% 2 denier bi-component (PE sheath/PP core) melty fibers. A minimum web weight of 30 gsm has surprisingly been found necessary, in one embodiment, to adequately fill out the web geometry during a subsequent embossing process (described below).

Regardless of the exact fiber composition, in one embodiment, the fibers 40 are preferably randomly oriented, and bonded by compression and polymeric bonding of the fibers (e.g., bi-component fibers) at the edges to define partial or complete loops and to bond the formed web 22a to a backing (not shown). Alternatively, spunbond or adhesive webs or spray adhesives, or any other known technique can also be used to bond the formed web 22a to a backing.

As shown in FIG. 3, for example, some or a majority or all of the loop-like fibers 40 are oriented such that a closed end 42 (referenced in FIG. 3 for several of the fibers 40) is at an outer face of the working surface 24. This configuration of the fibers 40 is in contrast to other wipe constructions in which the working face has hooks. It has surprisingly been found that by forming the fibers 40 as loops, the resultant cleaning wipe 20 does not generate an audible "scratching" noise as the working surface 24 is wiped across a hard surface, yet desired capture/retention of debris is still achieved. Alternatively, the fibers 40 can have a wide variety of other configurations, and need not be loops or loop-like.

With the above properties in mind, the initial web 22a can be formed in a variety of known fashions including, for example, carding, spunbond, meltblown, airlaid, wetlaid, etc. The initial web 22a can be consolidated by any known technique such as, for example, hydroentanglement, thermal bonding (e.g., calender or through air), chemical bonding, etc.

Method of Processing the Web

Once the initial web 22a is formed, the web 22a is subjected to processing to produce the working surface 24 consisting of one or more of the first region(s) 30, one or more of the second region(s) 32, and one or more of the third region(s) 34 coated with an adhesive 35. In one embodiment, the working surface 24 is formed by subjecting the initial web 22a to compressive forces, for example by passing the initial web 22a between a patterned embossing roller and a flat roller (or an engraved roller). FIG. 4 illustrates one embodiment of a calender system 50 capable of processing the initial web 22a to form the working surface 24. The system 50 includes a patterned embossing roller 52 and a flat roller 54. For applying the adhesive, a transfer roller 64 is included. The embossing roller 52 defines a pattern of grooves and lands, including first grooves 56 and second grooves 58 as well as first lands 60 and second lands 62 (with the first lands 60 being defined at the base of the second grooves 58 and the second lands 62 defining a maximum outer diameter of the roller 52). As described below, the first grooves 56 are deeper than the second grooves 58, and correspond with/generate the first regions 30, whereas the second grooves 58 correspond with/generate the second regions 32. In other words, the first lands 60 correspond with/generate the second regions 32, and the second lands 62 correspond with/generate the third regions 34.

U.S. patent application Ser. No. 11/025388 filed on Dec. 29, 2004, the disclosure of which is herein incorporated by reference, discloses a preferred method of applying adhesive to a web. This method may be used in conjunction with the disclosed embossing roller 52 and flat roller 54. The arrows included in FIG. 4 indicate the direction of movement of the web 22 and the rollers 52, 54, and 64.

The initial web 22a is passed between the embossing roller 52 and the flat roller 54. A constant distance between center points of the rollers 52, 54 is maintained, whereby a minimum distance between the rollers 52, 54 is achieved at the second lands 62. The rollers 52, 54 impart a compression force on to the initial web 22a, with maximum compression being achieved at the second lands 62, intermediate compression being achieved at the first lands 60, and minimal or no compression occurring at the first grooves 56. The resultant web 22 is thus characterized by the third regions 34 being more compressed than the second regions 32, and the second regions 32 being more compressed than the first regions 30. While the second side 36 is shown as being relative flat following processing by the system 50, the system 50 can alternatively be configured to render the second side 36 to have desired, non-continuous shape(s).

The apparatus included to applying the adhesive 35 generally includes a dispenser 6 to dispense the adhesive 35 onto the transfer roller 64 that works in conjunction with the embossing roller 52 and flat roller 54. The transfer roller 64 rotatably engages with the embossing roller 52 to transfer the adhesive 35 from the transfer roller 64 to the embossing roller 52. In one embodiment, a doctor blade 7 is provided adjacent the transfer roller 64 to spread the adhesive 35 uniformly over the entire outer surface of the transfer roller 64.

As shown in FIG. 4, the second lands 62 contact the transfer roller 64, and therefore the adhesive 35, so that adhesive 35 is placed on the second lands 62. During the embossing process, the adhesive 35 is transferred to the web 22 so that the adhesive 35 ultimately is placed within third regions 34. It is understood that providing a different embossing roller 52 or varying the thickness or type of adhesive may result in application of the adhesive in both the third regions 34 and second regions 32. As illustrated in the embodiment shown in FIG. 4, adhesive separating element 8 and second adhesive separating element 9 may be included to cut any adhesive strands that may bridge the gap between the transfer roller 64 and the embossing roller 52 or between the web 22 and the embossing roller 52. Such a separating element may be an electrically resistive heating element, such as NICHROME heating element or wire.

The desired thickness of the adhesive 35 applied to the transfer roller 64 will depend on the type of adhesive, the intended end use application for the web, and on the geometry of the embossing roller 52. In one embodiment an acrylic hot-melt pressure-sensitive adhesive 35 is applied to the transfer roller 64 in a thickness of 0.001-0.004 inches.

The amount of adhesive 35 applied to the web 22 will depend on a number of factors including the type of adhesive and the physical characteristics of the web. The adhesive 35 is typically coated on to the web at a minimum weight of about 1 gsm, more typically of at least about 2.5 gsm, and even more typically at least about 4 gsm, and at a maximum weight of no more than about 25 gsm, more typically no more than about 15 gsm, and even more typically no more than about 8 gsm.

A number of other manufacturing techniques can be employed to process the initial web 22a in a manner that generates the desired working surface 24. For example, the patterned embossing roller 52 can incorporate different patterns from that shown. In another embodiment, a heavy weight carded web can be embossed as described above with reference to FIG. 4. Additionally, alternative methods or variations on the application of the adhesive 35 are within the scope of the invention.

Additional Cleaning Wipe Components

Figure 5:
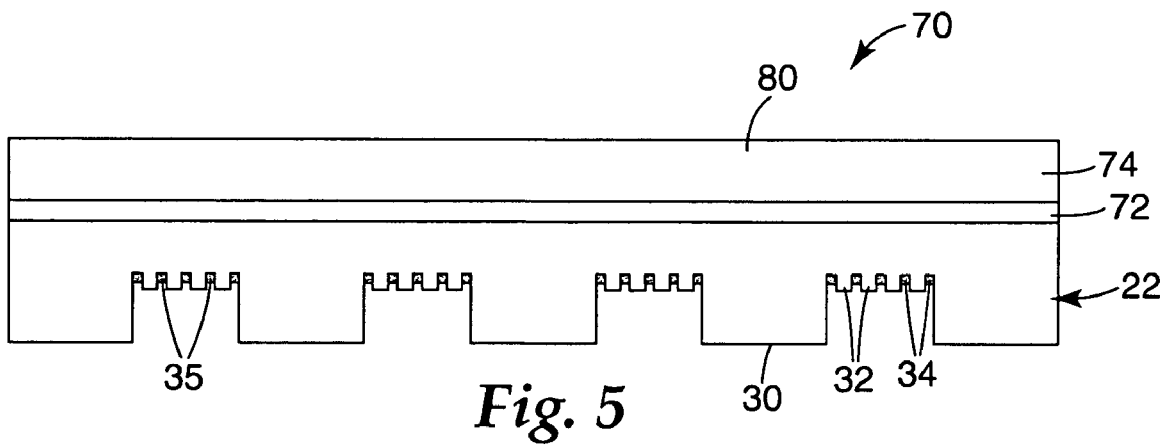
FIG. 5 is a schematical cross-sectional view of an alternative embodiment cleaning wipe in accordance with the present invention.

While the cleaning wipe 20 has been described as including the single web 22, in one preferred embodiment, additional webs/substrates are provided. For example, FIG. 5 illustrates one alternative embodiment cleaning wipe 70 including the web 22 and an outer layer 74 attached to the web 22 with adhesive 72. As described below, the outer layer 74 provides additional, beneficial features to the cleaning wipe 70.

In a preferred embodiment outer layer 74 is directly secured to web 22. The outer layer 74 maybe elastic or non-elastic, a nonwoven, a film, a foam, a knitted or woven fabric, or a mesh or scrim. Preferably, outer layer 74 is a nonwoven material having a basis weight of 7 gsm to 70 gsm and preferably from 10 gsm to 30 gms. Although the outer layer 74 is shown connected to web 22 with an adhesive layer 72, any known attachment mechanism may be use such as, but not limited to, needle punching or melty fibers within either the outer layer 74 or web 22. Outer layer 74 provides support to the web 22 to help prevent the web 22 from expanding and therefore collapsing the regions 30-34.

In one embodiment, the outer layer 74 is configured to facilitate attachment/mounting of the cleaning wipe 70 to a cleaning implement or tool. For example, the outer layer 74 can include or consist of a plurality of loops (e.g., loop or loop-like fibers) or similar structures (e.g., hooks) extending from a back surface 80 of the cleaning wipe 70. Alternatively, the outer layer 74 can include or have attached thereto any other form of fastening component, such as mechanical fasteners, auto-adhesion polymers, polar polymers, etc. The fastening component(s) can be provided across an entirety of the back surface 80, or can be discretely located (e.g., pattern coated adhesive). Conversely, the tool can be adapted to retain the cleaning wipe 70 without the provision of an attachment/mounting component with the cleaning wipe 70 (e.g., the tool can include mechanical grippers for retaining the cleaning wipe 20).

Method of Use and Packaging

The cleaning wipe 20, 70 may be used in conjunction with an appropriate cleaning implement or tool (not shown) having any variety of shape or configuration. If use with a tool, the cleaning wipe 20, 70 has an overall shape and size commensurate with the tool. Once mounted to the tool, the tool can be manipulated to guide the cleaning wipe 20, 70 across a surface to be cleaned (not shown) as part of a cleaning operation. In another alternative embodiment, the cleaning wipe 70 is handled directly by the user's hand, such that a separate cleaning tool or implement is not required.

Regardless of how the cleaning wipe 20, 70 is deployed, the wipe 20, 70 is uniquely able to capture and retain different types of debris. In particular, and with reference to FIG. 2, lightweight, fine debris, and specifically including human or pet hair, is captured within and retained by the first regions 30 due to their high loft in combination with the above-described spacing between adjacent pairs of the first regions 30. Conversely, dirt and other particulate-type debris, as well as more adherent debris such as films or scum, is readily captured and retained within the second regions 32 due to their loft in combination with the spacing provided by the third regions 34 and adhesive 35.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

EXAMPLES

A carded calendared backing web (15 gsm blend of 65% Wellman 1.5 denier PET/35% Kosa T-254 2 denier melty fiber) was prepared for use as a backing web. A second 38 gsm lofty carded thermo-bonded web (65% 6 denier Wellman PET/35% Kosa T-254 2 denier melty fiber) was also prepared. The two webs were fed together into a pair of heated embossing rolls so that the lofty web was in contact with the profiled embossing roll. At the point of embossing, the profiled web was coated with 4 gsm of a hot melt acrylic pressure sensitive adhesive as shown in the transfer coating process described in FIG. 4 to make a product described in FIG. 2. The finished profiled web is shown in the attached FIG. 6.

What is claimed is:

1. A cleaning wipe for picking up debris, the cleaning wipe comprising:
    a single layer nonwoven web having a uniform construction of fibers forming at least partial loops defining a working surface opposite a second planar surface, the web comprising:
        a plurality of laterally extending first regions having a first peak with a first height and wherein the first region is essentially free of tacky adhesive;
        a plurality of laterally extending second regions having a second peak with a second height; and
        a plurality of laterally extending third regions having a third height and wherein the third region includes a tacky adhesive;
    wherein the first height is greater than the second height, which is greater than the third height; and
    wherein the first, second, and third regions are arranged in a repeating pattern of adjacent first regions separated by second regions adjacent ones of which are separated by one of the third regions, wherein a width of each first region is greater than a width of each third region; and
    wherein the first, second and third regions are visually distinct from one another.

2. The cleaning wipe of claim 1, wherein a lateral distance between the adjacent pair of first regions is not less than a width of either of the pair of first regions.

3. The cleaning wipe of claim 1, wherein each of the regions has a length greater than a width, and further wherein a width of the first regions is greater than the width of the second regions and the third regions.

4. The cleaning wipe of claim 3, wherein at least one of the first regions, at least one of the second regions, and at least one of the third regions extends across at least 75% of a corresponding dimension of the working surface.

5. The cleaning wipe of claim 1, wherein the first region is adapted to retain a first debris and the second region is adapted to retain a second debris, the first debris being generally finer than the second debris.

6. The cleaning wipe of claim 1, wherein the first degree of loftiness is characterized as having a bulk density of at least 100% less than a bulk density associated with the second degree of loftiness.

7. The cleaning wipe of claim 1, wherein the first region is characterized as having less fibers per unit volume than the second region and the third region.

8. The cleaning wipe of claim 7, wherein the second region is characterized as having less fibers per unit volume than the third region.

9. The cleaning wipe of claim 1, further comprising an outer layer connected to the web.

10. The cleaning wipe of claim 1, wherein the adhesive is an acrylic pressure sensitive adhesive.

11. The cleaning wipe of claim 1, wherein the first region, second region, and third region are linear and parallel to one another.

12. The cleaning wipe of claim 11, wherein the first region, second region, and third region are disposed at an angle of between 0 to 90 degrees with respect to an intended wiping direction.

* * * * *